United States Patent
Ogawa

(10) Patent No.: US 9,610,936 B2
(45) Date of Patent: Apr. 4, 2017

(54) TRAVEL SUPPORT DEVICE, TRAVEL SUPPORTING METHOD, AND DRIVE SUPPORT SYSTEM

(71) Applicant: TOYOTA JIDOSHA KABUSHIKI KAISHA, Toyota-shi, Aichi-ken (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/901,455

(22) PCT Filed: Aug. 20, 2014

(86) PCT No.: PCT/JP2014/004242
§ 371 (c)(1),
(2) Date: Dec. 28, 2015

(87) PCT Pub. No.: WO2015/045261
PCT Pub. Date: Apr. 2, 2015

(65) Prior Publication Data
US 2016/0325727 A1 Nov. 10, 2016

(30) Foreign Application Priority Data
Sep. 24, 2013 (JP) ................................. 2013-197079

(51) Int. Cl.
*B60L 9/00* (2006.01)
*B60W 20/12* (2016.01)

(52) U.S. Cl.
CPC ....... *B60W 20/12* (2016.01); *B60W 2550/143* (2013.01); *B60W 2550/402* (2013.01)

(58) Field of Classification Search
CPC .................... B60W 20/12; B60W 2550/402
USPC ........................................................ 701/22
See application file for complete search history.

(56) References Cited

U.S. PATENT DOCUMENTS

| 9,132,833 | B2* | 9/2015 | Hokoi | B60W 20/40 |
| 2003/0015358 | A1* | 1/2003 | Abe | B60K 6/48 180/65.25 |
| 2010/0185349 | A1* | 7/2010 | Harada | B60K 6/365 701/22 |
| 2014/0350761 | A1* | 11/2014 | Endo | B60W 20/00 701/22 |
| 2016/0137185 | A1* | 5/2016 | Morisaki | B60L 7/10 701/22 |

FOREIGN PATENT DOCUMENTS

| JP | 2009-012605 A | 1/2009 |
| JP | 2015-030407 A | 2/2015 |

* cited by examiner

*Primary Examiner* — Thomas G Black
*Assistant Examiner* — Luke Huynh
(74) *Attorney, Agent, or Firm* — Oliff PLC

(57) ABSTRACT

A travel route of a vehicle from a present location to a destination is divided into sections. For each of the sections, a travel load of when the vehicle travels in the section in the EV mode is set. A mode planner plans one of the EV mode and the HV mode as the travel mode for each of the sections. A section adjuster adjusts the sections so that sections relatively close to a destination become shorter than sections relatively distant from the destination. The mode planner plans either one of the EV mode and the HV mode as the travel mode of the section for the adjusted sections.

12 Claims, 6 Drawing Sheets

TRAVEL SUPPORT DEVICE, TRAVEL SUPPORTING METHOD, AND DRIVE SUPPORT SYSTEM

TECHNICAL FIELD

The present disclosure relates to a travel support device and a travel supporting method that manages the application of a plurality of travel modes in a vehicle. The present disclosure also relates to a drive support system having a travel support function.

BACKGROUND ART

A hybrid vehicle uses an internal combustion engine and a motor as drive sources and travels in a plurality of modes. The travel modes of a hybrid vehicle includes an HV mode, which uses only the internal combustion engine or simultaneously uses the internal combustion engine and the motor, and an EV mode, which stops the internal combustion engine and uses only the motor. A travel support device including a navigation system installed in a hybrid vehicle obtains a travel route from the present location to a certain destination based on map information and road traffic information. The travel support device provides support for selection of the travel mode applied to each section in the travel route. Japanese Laid-Open Patent Publication No. 2009-12605 discloses an example of a vehicle controller having such a travel support function.

CITATION LIST

Patent Literature

PLT 1: Japanese Laid-Open Patent Publication No. 2009-12605

Summary

Technical Problem

Japanese Laid-Open Patent Publication No. 2009-12605 describes a vehicle controller that sets the travel mode for each section in the travel route in view of the energy balance of the entire travel route so that the state of charge of the battery, which is a rechargeable battery, approaches the lower limit value at the destination. If situations do not go as predicted due to changes in the traffic flow and the state of charge of the battery becomes lower than predicted, the battery may be depleted in a section planned for the EV mode. That is, the vehicle may stop travelling in the EV mode at a point that differs from the planned point. This may be annoying to the driver.

Such a problem common occurs in a device or a method that assigns travel modes to vehicles that travel in modes having different energy balances.

It is an object of the present disclosure to enable appropriate switching of travel modes for each section set in a travel route.

One aspect of the present disclosure is a travel support device that supports travelling of a vehicle from a present location to a destination. The vehicle includes an internal combustion engine and a motor. The motor uses a battery. The motor functions as a drive source of the vehicle in an EV mode. At least the internal combustion engine functions as a drive source of the vehicle in an HV mode. A travel route of the vehicle from the present location to the destination is divided into a plurality of sections. The sections include sections relatively close to the destination and sections relatively distant from the destination. For each of the sections, a travel load of when the vehicle travels in the EV mode in the section is set. The travel support device includes a mode planner, which is configured to plan either one of the EV mode and the HV mode as a travel mode for each of the sections, and a section adjuster, which adjusts the sections relatively close to the destination to be shorter than the sections relatively distant from the destination. The mode planner is configured to plan one of the EV mode and the HV mode as a travel mode for each of the adjusted sections.

A further aspect of the present disclosure is a travel supporting method for supporting travelling of a vehicle from a present location to a destination. The vehicle includes an internal combustion engine and a motor as a drive source. The motor uses a battery. The vehicle includes an internal combustion engine and a motor, each functioning as a drive source. The motor uses a battery. The motor functions as the drive source of the vehicle in an EV mode. At least the internal combustion engine functions as the drive source of the vehicle in an HV mode. The travel supporting method includes dividing a travel route of the vehicle from the present location to the destination into a plurality of sections. The sections include sections relatively close to the destination and sections distant from the destination. The methods further include setting, for each of the sections, a travel load of when the vehicle travels in the EV mode in the section; planning either one of the EV mode and the HV mode as a travel mode for each of the sections; adjusting the sections so that the sections relatively close to the destination become shorter than the sections relatively distant from the destination; and planning the travel mode for each of the adjusted sections.

In the configuration and the method described above, the sections are adjusted so that sections in the travel route close to the destination are shorter than the other sections. The travel mode is planned for each section of after the adjustment. In other words, sections relatively close to the destination in which the battery may be depleted are set as short sections. This reduces cases in which the point at which the battery is depleted when the vehicle actual travels differs from the planned switching point of the travel modes. Thus, travel modes are appropriately set for sections in the travel route.

In the travel support device, the section adjuster is configured to divide the one of the sections planned to be in the EV mode that is closest to the destination. In the travel supporting method, adjusting the sections includes dividing the one of the sections planned to be in the EV mode that is closest to the destination.

In the configuration and the method described above, the one of the sections planned to be in the EV mode that is closest to the destination is divided. The travel modes are planned for the sections of the travel route including the divided sections. In other words, the section including the point at which the battery may be depleted when the vehicle is actually travelled is divided. The travel modes are assigned to the divided sections. This reduces cases in which the point at which the battery is depleted when the vehicle actual travels differs from the planned switching point of the travel modes. Thus, travel modes are appropriately set for sections in the travel route.

In the travel support device, the section adjuster is configured to divide the one of the sections that is closest to the destination so that a length of a section obtained by dividing the one of the sections that is closest to the destination is smaller than or equal to a predetermined distance.

In the configuration described above, the one of the sections planned to be in the EV mode that is closest to the destination is divided so as to become smaller than or equal to a predetermined distance. Therefore, the section that is planned to be in the EV mode and close to the destination is finely divided. This further reduces cases in which the point at which the battery is depleted when the vehicle actual travels differs from the planned switching point of the travel modes. Thus, travel modes are further appropriately set for sections in the travel route.

In the travel support device, the section adjuster is configured to set a hypothetical travel load for the divided sections to plan the HV mode as the travel mode from the one of the divided sections that is relatively close to the destination.

In the configuration described above, a hypothetical travel load is set for the newly formed sections obtained as a result of dividing. The hypothetical travel load is set so that the travel mode of the one of the sections close to the destination is first planned to be in the HV mode. Therefore, the travel mode of a section distant from the destination and including the point at which the battery may be depleted when the vehicle actually travels is set to the EV mode. Thus, the battery may be fully used at a point distant from the destination.

In the travel support device, the section adjuster is configured to combine the sections that are relatively distant from the destination.

In the travel supporting method, adjusting the sections includes combining the sections that are relatively distant from the destination.

In the configuration and the method described above, the sections are adjusted so that sections other than those close to the destination are combined. The travel modes are planned for the adjusted sections. Therefore, the section including the point at which the battery may be depleted when the vehicle actually travels is not combined. This reduces cases in which the point at which the battery is depleted when the vehicle actual travels differs from the planned switching point of the travel modes. Thus, travel modes are appropriately set for sections in the travel route.

In the travel support device, the section adjuster is configured to combine sections in which a distance to the destination is greater than or equal to a predetermined distance.

In the configuration described above, a section in which the distance to the destination is smaller than or equal to a predetermined distance is not combined. Therefore, a section close to the destination in which the battery may be depleted when the vehicle is actually travelling is not combined. This reduces cases in which the point at which the battery is depleted when the vehicle actual travels differs from the planned switching point of the travel modes.

The travel support device further includes a display device that visually displays the planned travel modes. The display device is configured to display the travel mode as the HV mode for the one of the sections that is closest to the destination and planned to be in the EV mode.

The travel supporting method further includes visually displaying the planned travel modes on a display device, and displaying the travel mode as the HV mode for the one of the sections that is closest to the destination and planned to be in the EV mode.

When the vehicle actually travels, the travel mode may be switched to the HV mode in the EV mode section that is closest to the destination. In the configuration or the method described above, the display device displays the travel mode of the EV mode section that is closest to the destination as the HV mode. Therefore, if situations are not as predicted due to changes in the traffic flow or early depletion of the battery, the driver is less likely to by annoyed even when travelling in the HV mode where the EV mode had been planned.

Another aspect of the present disclosure is a drive support system that supports driving of a vehicle. The vehicle includes an internal combustion and a motor. The motor uses a battery. The motor functions as the drive source of the vehicle in an EV mode. At least the internal combustion engine functions as the drive source of the vehicle in an HV mode. A travel route of the vehicle from a present location to a destination is divided into a plurality of sections. Either one of the EV mode and the HV mode is planned as a travel mode for each of the sections. The drive support system is configured to support the driving of the vehicle based on the travel mode. The drive support system includes a travel support device that supports travelling of the vehicle from the present location to the destination. The sections include sections relatively close to the destination and sections relatively distant from the destination. For each of the sections, a travel load of when the vehicle travels in the EV mode in the section is set. The travel support device includes a mode planner that is configured to plan either one of the EV mode and the HV mode as the travel mode for each of the sections, and a section adjuster that adjusts the sections so that the sections relatively close to the destination become shorter than the sections relatively distant from the destination. The mode planner is configured to plan one of the EV mode and the HV mode as the travel mode for each of the adjusted sections.

The configuration described above supports the driving of the vehicle can be supported while appropriately switching travel modes for sections set in the travel route.

BRIEF DESCRIPTION OF DRAWINGS

The invention, together with objects and advantages thereof, may best be understood by reference to the following description of the presently preferred embodiments together with the accompanying drawings in which.

DESCRIPTION OF EMBODIMENTS

First Embodiment

FIGS. 1 to 4 show a first embodiment of a travel support device, a travel supporting method, and a drive support system. The travel support device, the travel supporting method, and the drive support system of the present embodiment are applied to a hybrid vehicle that uses drive sources including an electric motor, which uses a rechargeable battery as a power source, and an internal combustion engine, which uses gasoline or other fuel as another power source.

Figure 1:
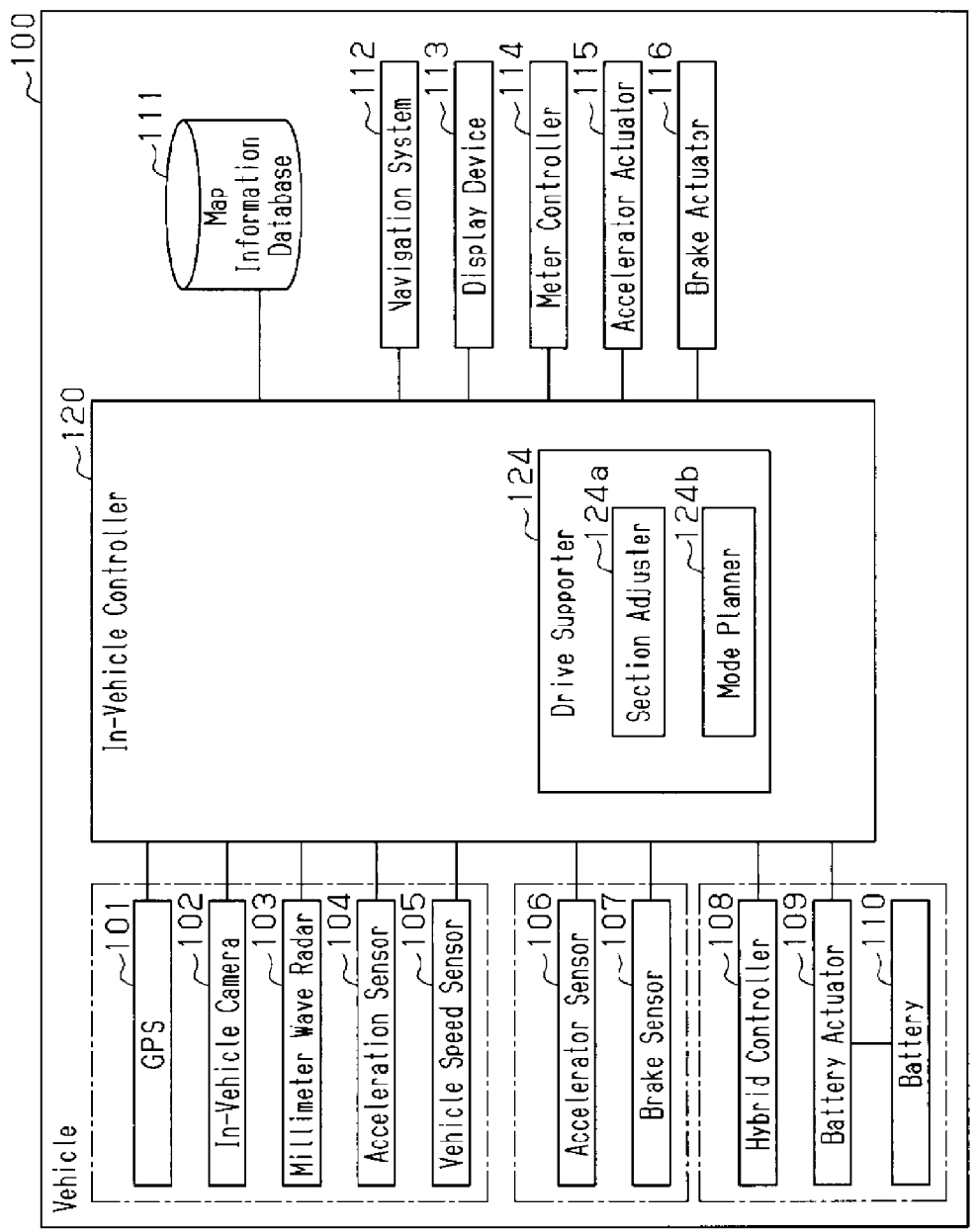
FIG. 1 is a block diagram showing a travel support device according to a first embodiment of the present disclosure.

As shown in FIG. 1, a vehicle 100 is provided with a Global Positioning System (GPS) 101, an in-vehicle camera 102, a millimeter wave radar 103, an acceleration sensor 104, and a vehicle speed sensor 105, as devices for detecting a travelling state, that is, a movement state of the vehicle 100. The GPS 101, the in-vehicle camera 102, the millimeter wave radar 103, the acceleration sensor 104, and the vehicle speed sensor 105 are connected to an in-vehicle controller 120 that executes various types of vehicle controls through an in-vehicle network such as a Controller Area Network (CAN). The in-vehicle controller 120 is a so-called Electronic Control Unit (ECU) and includes a small computer having a computation device and a storage device. The in-vehicle controller 120 may execute various types of controls by performing computations with the computation device using programs and parameters stored in the storage device.

The GPS 101 receives signals from GPS satellites, and detects the position of the vehicle 100 based on the signals received from the GPS satellites as a latitude and longitude. The GPS 101 outputs the position information, which is information indicating the detected position (latitude and longitude) of the vehicle 100, to the in-vehicle controller 120. The in-vehicle camera 102 images the surrounding environment of the vehicle 100, and outputs the imaged image data to the in-vehicle controller 120. The millimeter wave radar 103 detects objects in the periphery of the vehicle 100 using radio waves in the millimeter wave band, and outputs the signal corresponding to the detection result to the in-vehicle controller 120.

The acceleration sensor 104 detects the acceleration of the vehicle 100, and outputs a signal corresponding to the detected acceleration to the in-vehicle controller 120. The vehicle speed sensor 105 detects the rotation speed of a wheel of the vehicle 100, and outputs a signal corresponding to the detected rotation speed to the in-vehicle controller 120.

An accelerator sensor 106 detects the amount an accelerator pedal is depressed by a driver, and outputs a signal corresponding to the detected depression amount of the accelerator pedal to the in-vehicle controller 120. The brake sensor 107 detects the amount a brake pedal is depressed by the driver, and outputs a signal corresponding to the detected depression amount of the brake pedal to the in-vehicle controller 120.

The vehicle 100 includes an accelerator actuator 115, which controls the drive state of the internal combustion engine, and a brake actuator 116, which controls the brake. The accelerator actuator 115 and the brake actuator 116 are electrically connected to the in-vehicle controller 120. The accelerator actuator 115 controls the internal combustion engine based on the control amount of the internal combustion engine calculated by the in-vehicle controller 120 from the detection value of the accelerator sensor 106. The brake actuator 116 controls the brake based on the control amount of the brake calculated by the in-vehicle controller 120 from the detection value of the brake sensor 107.

The vehicle 100 includes a battery 110, which is a power source of the electric motor that is the drive source, and a battery actuator 109, which controls charging and discharging of the battery 110. The battery actuator 109 is electrically connected to the in-vehicle controller 120. The battery actuator 109 manages the charging and the discharging of the battery 110. The battery actuator 109 controls the discharging of the battery 110 to drive the electric motor, and charges the battery 110 when the electric motor is regenerated.

The vehicle 100 also includes a hybrid controller 108 that controls the driving of the internal combustion engine and the electric motor. The hybrid controller 108 is electrically connected to the in-vehicle controller 120. That is, the in-vehicle controller 120 electrically connects the hybrid controller 108 to the battery actuator 109, the accelerator actuator 115, and the brake actuator 116. The hybrid controller 108 is also an ECU and is includes a small computer having a computation device and a storage device. The hybrid controller 108 may execute various types of controls by performing computations with the computation device using programs and parameters stored in the storage device.

Based on the detection results of the acceleration sensor 104, the vehicle speed sensor 105, and the accelerator sensor 106 input from the in-vehicle controller 120, the hybrid controller 108 sets the distribution, or the output ratio, of the drive forces of the internal combustion engine and the electric motor. In particular, the hybrid controller 108 adjusts the state of charge of the battery 110, which is the remaining energy of the battery 110, by changing the distribution, or output ratio, of the drive forces of the internal combustion engine and the electric motor.

Based on the distribution of the drive forces, the hybrid controller 108 generates a control command of the battery actuator 109 associated with the discharging of the battery 110, and information associated with the control amount of the internal combustion engine calculated by the in-vehicle controller 120. The hybrid controller 108 sets the distribution of the brake forces of the brake and the electric motor based on the detection results of the acceleration sensor 104, the vehicle speed sensor 105, and the brake sensor 107 input from the in-vehicle controller 120. Based on the distribution of the brake forces, the hybrid controller 108 generates the control command of the battery actuator 109 associated with the charging of the battery 110, and the information associated with the control amount of the brake calculated by the in-vehicle controller 120. That is, the hybrid controller 108 outputs the generated control commands to the battery actuator 109 to control the charging and the discharging of the battery 110. Therefore, the electric motor, which uses the battery 110 as the power source, that is, the electric power source, is driven by the discharging of the battery 110, and the battery 110 is charged by the regeneration of the electric motor. The in-vehicle controller 120 can monitor the execution of the hybrid control and the charging rate of the battery 110.

The vehicle 100 is switched between an EV mode and an HV mode. In the EV mode, the vehicle 100 is powered, when travelling, by the electric motor that serves as a drive source using the battery 110 as a power source. In the HV mode, the vehicle 100 is powered, when travelling, only by the internal combustion engine or simultaneously by the electric motor and the internal combustion engine that serves as drive sources. The hybrid controller 108 executes a control allowing the driver of the vehicle 100 to perform manual switching between the EV mode and the HV mode. The hybrid controller 108 also functions to perform automatic switching between the EV mode and the HV mode. In other words, the hybrid controller 108 executes a control for switching the EV mode and the HV mode based on information associated with the load produced when travelling in each section of the travel route of the vehicle 100 input from the in-vehicle controller 120. The travel load is the load amount per unit distance of the section, that is, an average load amount required to travel in the section. The accumulated value of the travel load used to complete the section is defined as energy consumption.

The vehicle 100 includes a map information database 111 in which map data is registered. The map data is geographical data such as data of roads. The information associated with a position such as the latitude and longitude is registered in the map data along with data allowing for the display of the geography. The map data may register at least one of the names of intersections, the names of roads, the names of directions, direction guides, and information of facilities.

The map information database 111 includes node data, which is information associated with a node indicating a position on a road, and link data, which is information associated with a link serving as a section between the two nodes. The node is set at a position of a certain traffic element such as an intersection, a traffic light, and a curve, and a point where the number of lanes in a road changes. The node data includes the position information of the node and the road information of that position. A link is set by the section between two nodes. The link data includes the information of the two nodes and the road information of the section in the link The travel load may be acquired or calculated from the travel load information contained in the link data. The road information of the section of the link includes information such as a starting point position, an ending point position, distance, route, and terrain. The link data may include various types of data such as cost data including the travel load of the section of the link, road data including road type, mark data indicating a specific position, intersection data indicating information of an intersection, and facility data indicating information of a facility.

In detail, the node data may be configured by a node ID, which is an identification number of the node, coordinates of the node, link IDs of all links connected to the node, and a node type indicating the type of the node such as an intersection and a junction. The node data may be configured to include data indicating the properties of a node such as an image ID, which is an identification number of an image representing the node.

The link data may be configured by a link ID, which is an identification number of the link, a link length, and a node ID of each node connected to the starting point and the ending point. The link data may be configured to include necessary information of the data indicating the road type such as express highway, toll road, general road, urban/suburb road, and mountain road, road width, number of lanes, link travelling time, limit speed, and road gradient. The link data may be configured to include data indicating an average value, a maximum value, and a minimum value of each of the travel time, the travel speed, consumed fuel amount, and consumed power amount as the travel load information, which is the necessary output of the vehicle 100 in each link The consumed power amount is the power amount consumed by the electric motor when the vehicle 100 is travelling in the EV mode. The travel load of the link and the section is acquired or calculated based on the travel load information. The travel load is an average value in the link (section), and the unit of the travel load is kW. The energy consumption serving as the accumulated value of the travel load necessary for the completion of each link (section) can be calculated from the travel load and the link length (section length).

A navigation system 112 that carries out routing assistance is installed in the vehicle 100. The navigation system 112 acquires the latitude and longitude of the present location Pa of the vehicle 100 from the in-vehicle controller 120, to which the detection result of the GPS 101 is input. When a destination Pb is set by the driver, the navigation system 112 specifies the latitude and longitude of the destination Pb. The navigation system 112 searches for a travel route from the present location Pa of the vehicle 100 to the destination Pb using a Dijkstra method with reference to the map information database 111. The navigation system 112 calculates the travel load, the travel time, the travel speed, the consumed fuel amount, and the consumed power amount in the searched travel route. The navigation system 112 outputs the searched travel route and the information indicating the calculated travel load, the travel time, the travel speed, the consumed fuel amount, and the consumed power amount to the in-vehicle controller 120, and also outputs the same to the display device 113 including a liquid crystal display arranged in the passenger compartment through the in-vehicle controller 120.

A meter controller 114 is arranged in the vehicle 100. The meter controller 114 controls the display of meters in an instrument panel arranged on a dashboard. The meter controller 114 acquires data indicating the charging and discharging situation of the battery 110 from the in-vehicle controller 120, and visually displays an energy flow in the vehicle 100 based on the acquired data. The energy flow is the flow of energy in the vehicle 100 resulting from the charging and discharging of the battery 110 and the drive force and regeneration of the electric motor. The energy flow may include a flow of energy in the vehicle 100 resulting from the drive force of the internal combustion engine.

When the travel route is input, the in-vehicle controller 120 assigns a travel mode to each section of the travel route. The in-vehicle controller 120 includes a drive supporter 124 that supports the assignment of travel modes to the travel route. The drive supporter 124 acquires information from the navigation system 112 of the travel route to the destination Pb set by the driver. The drive supporter 124 includes a section adjuster 124a. The section adjuster 124a adjusts sections of the travel route based on the acquired information of the travel route. The section adjuster 124a configures a part of the travel support device and is a function realized when the in-vehicle controller 120 executes a program. The section adjuster 124a also functions to adjust sections of the travel route in accordance with the distance and the travel load of each section of the travel route. The section adjuster 124a adjusts sections so that sections relatively close to the destination Pb are shorter than the other sections that are distant from the destination Pb.

The drive supporter 124 includes a mode planner 124b. The mode planner 124b plans the travel modes assigned to sections of the acquired travel route. The mode planner 124b configures a part of the travel support device is a function realized when the in-vehicle controller 120 executes a program. The mode planner 124b functions to plan the travel mode for each section of the travel route according to the travel load of each section.

Generally, satisfactory efficiency is obtained in sections where the travel load is small when using the electric motor to travel. Further, satisfactory efficiency is obtained in sections where the travel load is large when using the internal combustion engine to travel. The in-vehicle controller 120 thus assigns the EV mode to the sections where to travel load is small, and assigns the HV mode to sections where the travel load is large.

The mode planner 124b compares the travel loads of subject sections and assigns the EV mode in order from sections having low travel loads. The mode planner 124b accumulates the energy consumption of each of the sections assigned with the EV mode, and subtracts the accumulated value from the remaining energy amount of the battery 110. The mode planner 124b assigns the EV mode to each section in the travel route so that the accumulated value of the energy consumption does not exceed the remaining energy amount of the battery 110. The mode planner 124b assigns the EV mode to sections where the travel load is relatively low in the travel route. The mode planner 124b assigns the HV mode to sections to which the EV mode is not assigned.

The mode planner 124b outputs the travel mode planned for each section of the travel route to the display device 113. The display device 113 displays the travel mode planned in advance for the section in which the vehicle is travelling The hybrid controller 108 specifies the section in which the vehicle is currently travelling by acquiring position information from the in-vehicle controller 120. The hybrid controller 108 sets the vehicle 100 in the travel mode planned for the specified section. That is, the hybrid controller 108 switches the travel mode of the vehicle 100 to the EV mode or the HV mode assigned to each section whenever the travel route of the vehicle 100 is changed. Therefore, the vehicle 100 travels in the travel mode planned for the section in which the vehicle is currently travelling In the conventional technique, if situations are not as predicted due to changes in the traffic flow or early depletion of the battery 110, the battery 110 may be depleted in the middle of a section where the EV mode is planned. That is, travelling in the EV mode may end at a point differing from the planned point.

In order to prevent such a situation, the section adjuster 124a of the present embodiment divides the section closest to the destination Pb where the EV mode is planned into further sections having a predetermined distance alpha or less. Specifically, the section adjuster 124a divides the section closest to the destination Pb where the EV mode is planned into further sections under the condition that each section is longer than the distance alpha. The dividing process is performed so that the divided sections have the distance alpha or less.

The section adjuster 124a sets a hypothetical travel load for the newly divided sections so that the HV mode is first planned as the travel mode for of sections close to the destination Pb. The section adjuster 124a sets the hypothetical travel load to a value lower than the lowest travel load of the sections for which the HV mode is planned by the mode planner 124b. The section adjuster 124a then sets the hypothetical travel load for the newly divided section that is closest to the destination Pb. The hypothetical travel load is set to a higher value than the highest travel load of the sections for which the EV mode is planned by the mode planner 124b. The section adjuster 124a sets a hypothetical travel load for the newly divided sections so the hypothetical travel load becomes lower as the section closest to the destination Pb becomes farther.

The mode planner 124b re-plans the travel modes for the travel route where the section adjuster 124a has adjusted sections and set hypothetical travel loads.

Figure 2:
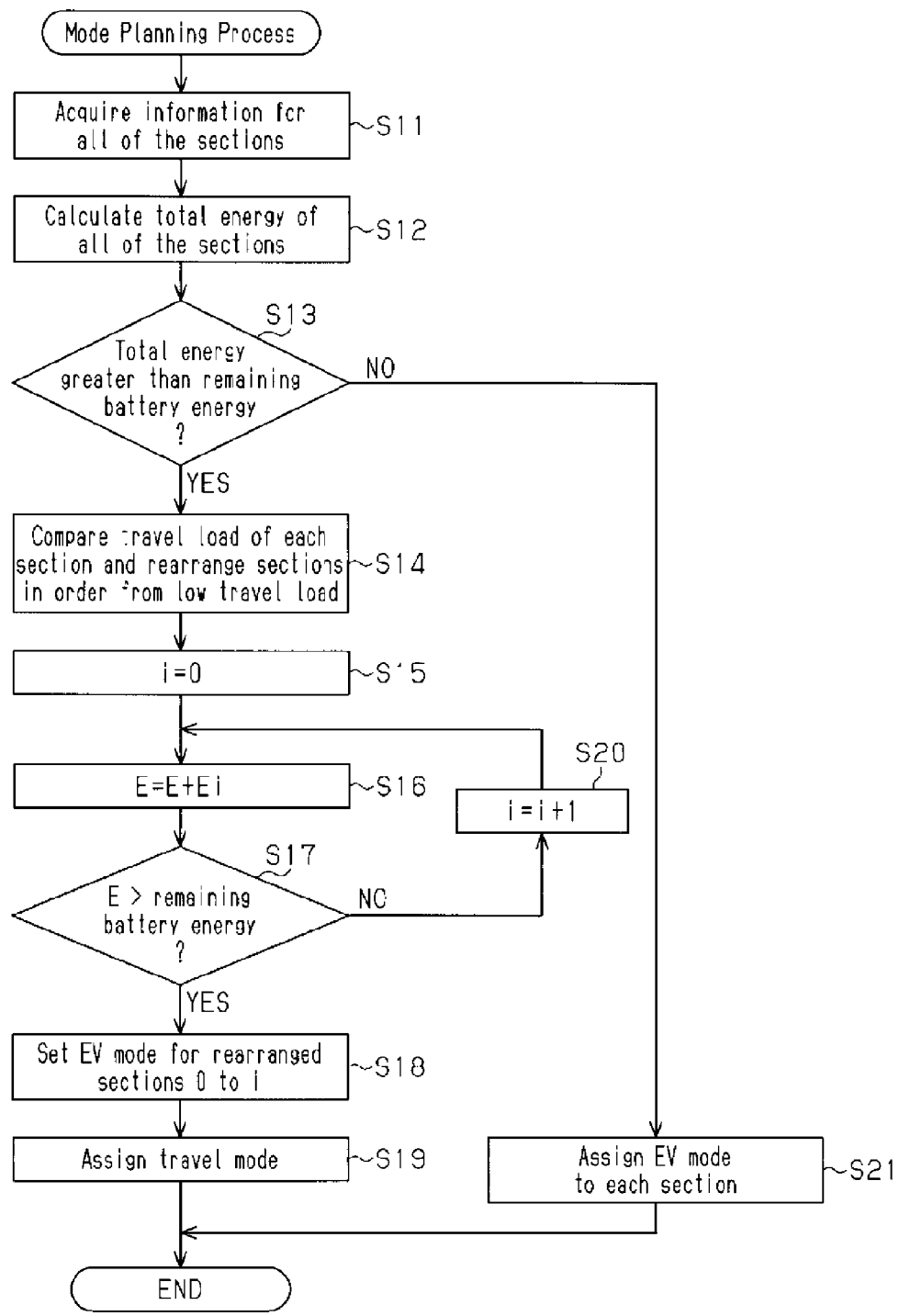
FIG. 2 is a flowchart of a process for planning travel modes with the travel support device of FIG. 1.

FIG. 2 describes an example of a process for planning travel modes with the drive supporter 124. The drive supporter 124 plans travel modes by assigning a travel mode to each section of the travel route whenever the travel route is transmitted from the navigation system 112.

As shown in FIG. 2, when the destination Pb is set by the navigation system 112, the drive supporter 124 acquires the route information of all sections in the travel route (step S11). The drive supporter 124 calculates the total consumption energy based on the information acquired for all of the sections (step S12), and determines whether or not the total consumption energy of all of the sections is greater than the remaining energy amount of the battery 110 (step S13). In other words, the mode planner 124b determines whether or not the vehicle can travel in the EV mode in all of the sections. When determining that the total energy consumption of all of the sections is not greater than the remaining energy amount of the battery 110 (step S13: NO), the drive supporter 124 assigns the EV mode to each section (step S21) and terminates the process for planning the travel modes.

When determining that the total energy consumption of all the sections is greater than the remaining amount of the battery 110 (step S13: YES), the drive supporter 124 compares the travel loads of each section, adds "i" in order from sections having low travel loads and rearranges a plurality of sections (step S14). The drive supporter 124 sets section i=0 (step S15), and adds the energy consumption Ei of section i to the sum E of the energy consumption (E=E+Ei, step S16).

The drive supporter 124 determines whether or not the sum E of the energy consumption at section i is greater than the remaining energy amount of the battery 110 (step S17). When determining that the sum E of the energy consumption to the section i is less than or equal to the remaining amount of the battery 110 (step S17: NO), the drive supporter 124 increments the section by one (i=i+1, step S20).

When determining that the sum E of the energy consumption to the section i is greater than the remaining energy amount of the battery 110 (step S17: YES), the drive supporter 124 sets the EV mode to the zeroth section to the ith section after the rearrangement (step S18). The drive supporter 124 assigns a travel mode to each section of the travel route (step S19), and terminates the process for planning the travel modes.

Figure 3:
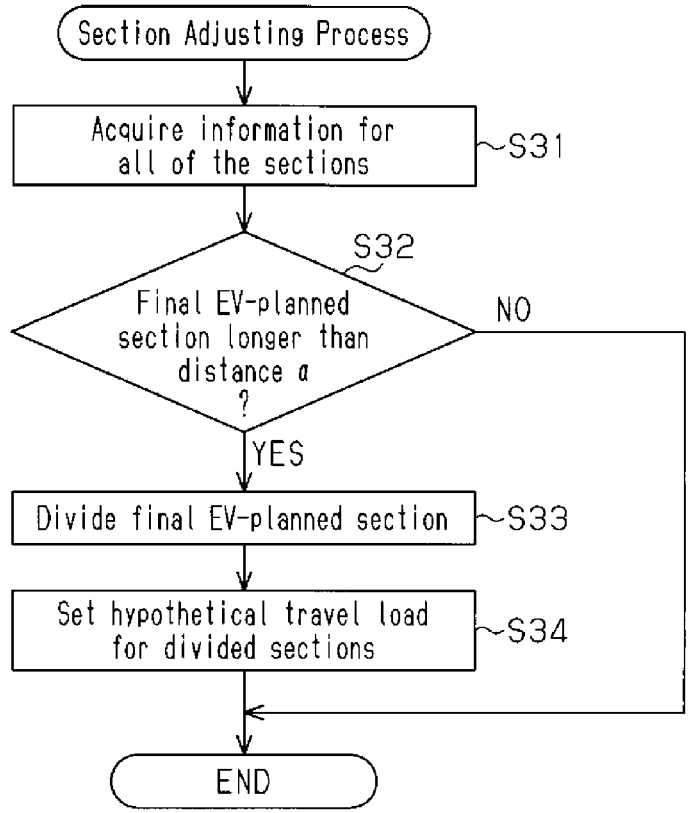
FIG. 3 is a flowchart of a process for setting sections with the travel support device of FIG. 1.

FIG. 3 describes one example of a process for adjusting sections of the travel route in the drive supporter 124. After the mode planner 124b performs the planning, the section adjuster 124a of the drive supporter 124 adjusts sections based on the travel modes planned by the mode planner 124b and the distance of each section.

As shown in FIG. 3, after the travel modes are planned by the mode planner 124b, the section adjuster 124a acquires the information of all of the sections (step S31). In other words, the section adjuster 124a acquires the travel modes planned by the mode planner 124b. Among the sections to which the EV mode is planned, the section closest to the destination Pb is the final EV planned section. The section adjuster 124a determines whether or not the distance of the final EV planned section is longer than the predetermined distance alpha (step S32). When determining that the distance of the final EV planned section is shorter than the predetermined distance alpha (step S32: NO), the section adjuster 124a terminates the process for adjusting sections.

When determining that the distance of the final EV planned section is longer than the predetermined distance alpha (step S32: YES), the section adjuster 124a divides the final EV planned section. In other words, the section adjuster 124a divides the current final EV planned section so that the new final EV planned section is shorter than the predetermined distance alpha (step S33). After the final EV planned section is divided, the section adjuster 124a sets the hypothetical travel load to the new sections (step S34). The hypothetical travel load is set to first plan the HV mode as the travel mode for sections close to the destination Pb. The hypothetical travel load is a value lower than the lowest travel load of the sections to which the HV mode is planned by the mode planner 124b, and is set to a value higher than the highest travel load of the sections to which the EV mode is planned by the mode planner 124b. The section adjuster 124a sets a low hypothetical travel load in order from the section closest to the destination Pb to the section distant from the destination Pb for the newly divided sections.

Figure 4:
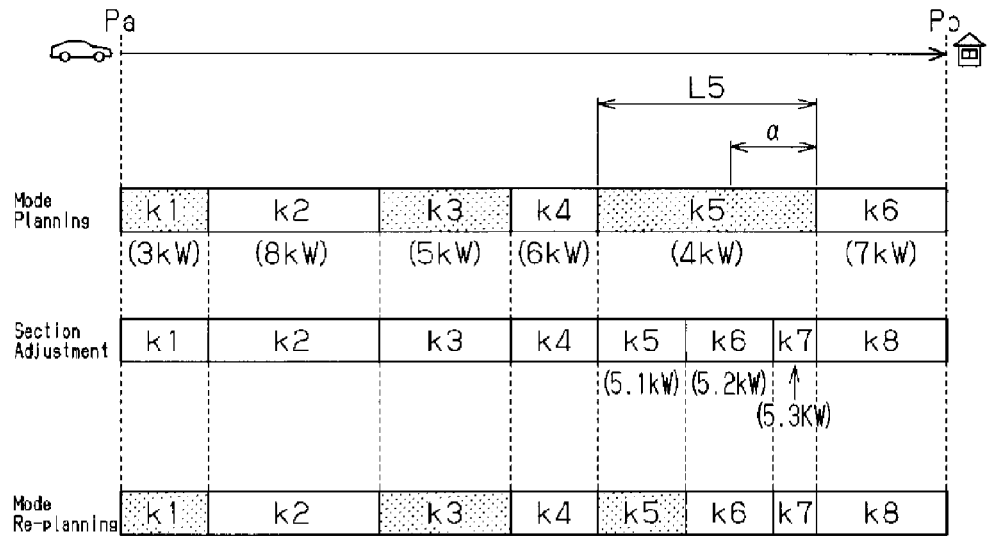
FIG. 4 is a chart illustrating an example of a travel route on which the travel support device of FIG. 1 performs a travel mode planning process and section adjustment.

FIG. 4 describes the operation of the first embodiment using an example of a travel route subject to the planning of the travel modes described above.

As shown in FIG. 4, the travel route searched by the navigation system 112, that is, the present location Pa to the destination Pb includes a first section k1 to a sixth section k6. The information on the travel load and the energy consumption of the first section k1 to the sixth section k6 are obtained from the map information database 111.

The mode planner 124b plans travel modes based on the remaining energy amount of the battery 110 and the travel load and the energy consumption of the first section k1 to the sixth section k6. In the present embodiment, as shown in FIG. 4, the travel mode of the first section k1, the third section k3, and the fifth section k5, in which the travel load is small, is planned and set in the EV mode.

The section adjuster 124a determines that distance L5 of the fifth section k5, which is the section that is closest to the destination Pb where the EV mode has been planned for by the mode planner 124b, is longer than the predetermined distance alpha. Thus, the section adjuster 124a divides the fifth section k5 into new fifth to seventh sections k5 to k7. Then, the section adjuster 124a sets the hypothetical travel load for each of the new fifth section k5 to the new seventh section k7. The hypothetical travel load is a value lower than the travel load 6 kW of the fourth section k4, which has the lowest travel load in the sections to which the HV mode is planned, and a value higher than the travel load 5 kW of the third section k3, which is the highest travel load in the sections to which the EV mode is planned. The section adjuster 124a sets the hypothetical travel load for the new fifth section k5 to the new seventh section k7 so that the hypothetical travel load decreases at sections farther from the destination Pb. Therefore, when the hypothetical travel load of 5.3 kW is set to the new seventh section k7 that is close to the destination Pb, a lower hypothetical travel load of 5.2 kW is set to the new sixth section k6, and a further lower hypothetical travel load of 5.1 kW is set to the new fifth section k5. Among the new fifth section k5 to the new seventh section k7, the new seventh section k7 that is close to the destination Pb is set to be shorter than each of the new fifth section k5 and the new sixth section k6 that are farther from the destination Pb.

The mode planner 124b re-plans the travel modes in the travel route where section adjustment has been performed and where the hypothetical travel load has been set by the section adjuster 124a. In the present embodiment, the mode planner 124b assigns the EV mode as the travel mode to only the new fifth section k5 that is far from the destination Pb. The mode planner 124b assigns the HV mode as the travel mode to the remaining new sixth section k6 and the new seventh section k7.

In the present embodiment, the fifth section k5, which is the section where the EV mode is planned that is closest to the destination Pb, is divided into a plurality of sections. The travel modes are re-planned in the travel route for the newly divided fifth section k5 to the new seventh section k7. This sets the section relatively close to the destination Pb where the remaining energy amount of the battery 110 is low when the vehicle 100 actually travels to be shorter than the predetermined distance alpha. This reduces cases in which the point at which the battery 110 is depleted when the vehicle actual travels differs from the planned switching point of the travel modes. Thus, the travel support device, the travel supporting method, and the drive support system may appropriately switch travel modes of sections set in a travel route.

The present embodiment has the advantages described below.

(1) The fifth section k5, which is a section relatively close to the destination Pb, is adjusted by the section adjuster 124a so as to be shorter than each of the first section k1 to the fourth section k4, which are sections distant from the destination Pb. The mode planner 124b plans the travel modes for the new fifth section k5 to the new seventh section k7 after the adjustment. In other words, the fifth section k5, which is close to the destination Pb where the battery 110 may be depleted when the vehicle 100 is actually travelling, is processed to become a relatively short section. This reduces situations in which the point at which the battery 110 may be depleted when the vehicle is actually travelling differs from the switching point of the planned travel modes. Therefore, the travel modes may be appropriately switched in the sections set in the travel route.

(2) Among the sections to which the EV mode is planned, the fifth section k5, which is the section closest to the destination Pb, is divided. Travel modes are planned in the travel route for each of the newly divided fifth section k5 to seventh section k7. In other words, the section is divided that includes the point at which the remaining energy amount of the battery 110 may become insufficient when the vehicle 100 is actually travelled. The travel mode is assigned to the divided sections. This reduces situations in which the point at which the battery 110 may be depleted when the vehicle is actually travelling differs from the switching point of the planned travel modes. Therefore, the travel modes may be appropriately switched in the sections set in the travel route.

(3) Among the sections to which the EV mode is planned, the fifth section k5, which is the section closest to the destination Pb where EV mode is planned, is divided so that the section closest to the destination Pb becomes smaller than or equal to the predetermined distance alpha. That is, the section to which the EV mode is planned that is close to the destination Pb is finely divided. This further reduces situations in which the point at which the battery 110 may be depleted when the vehicle is actually travelling differs from the switching point of the planned travel modes, and the travel modes may be further appropriately switched in the sections set in the travel route.

(4) The hypothetical travel load is set to the newly divided fifth section k5 to seventh section k7 so that the HV mode is planned as the travel mode for the sections close to the destination Pb. Therefore, among the new fifth section k5 to the new seventh section k7, which are where the battery 110 may be depleted when the vehicle is actually travelling, the travel mode of the new fifth section k5, which is far from the destination Pb, is set to the EV mode. Thus, the battery 110 may be fully used at a location that is far from the destination Pb.

Second Embodiment

Figure 5:
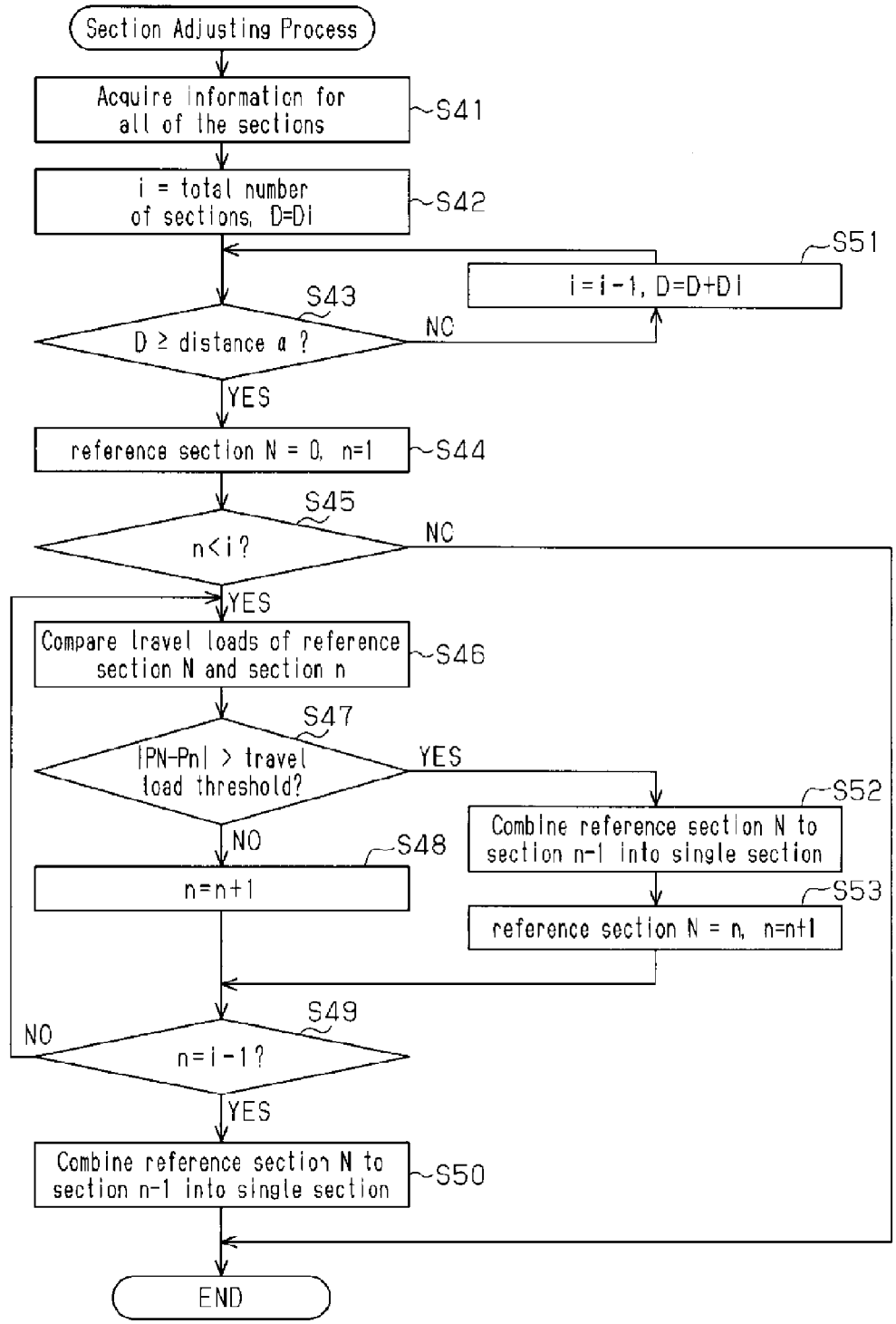
FIG. 5 is a flowchart of process for adjusting sections with a travel support device in a second embodiment.
Figure 6:
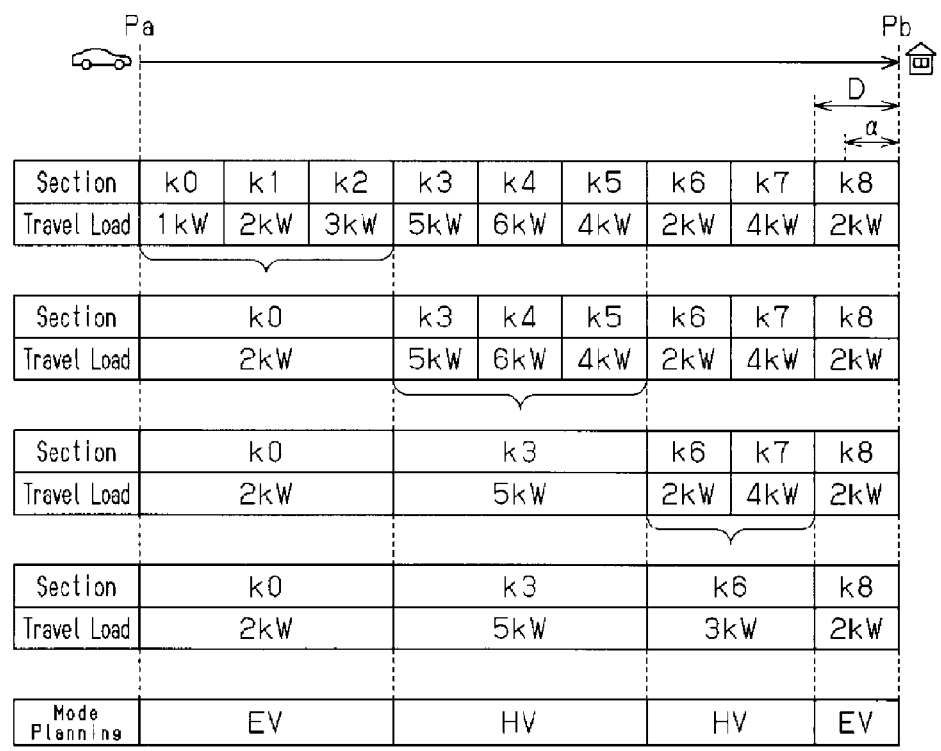
FIG. 6 is a chart illustrating an example of a travel route on which the travel support device of FIG. 5 performs a travel mode planning process and section setting.

FIGS. 5 and 6 show a second embodiment of a travel support device, a travel supporting method, and a drive support system. The travel support device, the travel supporting method, and the drive support system of the embodiment differ from the first embodiment in that sections of a travel route are combined in accordance with the travel load. The description will focus on differences from the first embodiment.

The section adjuster 124a combines sections in the travel route to reduce the load for processing the section information and to reduce the load for assigning the travel mode. The section adjuster 124a combines sections in which the distance to the destination Pb is greater than or equal to a predetermined distance. After the section adjuster 124a adjusts the sections of the travel route, the drive supporter 124 plans the travel modes with the mode planner 124b.

As shown in FIG. 5, when the destination Pb is set by the navigation system 112, the section adjuster 124a acquires the information of all of the sections in the travel route (step S41). The section adjuster 124a combines only the sections in which the distance to the destination Pb is greater than or equal to a predetermined distance alpha. As a pre-process, the total number of sections is first substituted to "i", and distance Di is substituted to the section distance D from the destination Pb to the end that is distant from the destination Pb in the ith section (D=Di, step S42). The section adjuster 124a determines whether or not the section distance D is greater than or equal to the predetermined distance alpha (step S43). When determining that the section distance D is not greater than or equal to the predetermined distance alpha (step S43: NO), the section adjuster 124a increments i (i=i−1. Step S51), and combines the section including the destination Pb and the section that is one section farther from the destination Pb to obtain the distance D=D+Di from the destination Pb to the end farther from the destination Pb of the ith section (step S51). The process then returns to step S43.

When determining that the section distance D is greater than or equal to the predetermined distance alpha (step S43: YES), the section adjuster 124a does not combine the ith section and proceeds to step S44.

After step S44, the section adjuster 124a combines the plurality of sections in order from sections close to the present location Pa to sections distant from the present location Pa. First, the section adjuster 124a sets section N that includes the present location Pa as a reference section, and substitutes a management number "0" to the reference section N. The section adjuster 124a then assigns a management number "n" to a section distant from the reference section N with respect to the present location Pa, and substitutes "1" to the management number "n" (step S44).

The section adjuster 124a determines whether or not the section management number n is smaller than "i" of the ith section already combined with the section including the destination Pb (step S45). In other words, the section adjuster 124a checks whether the section having the management number "n" has been combined with the section including the destination Pb. The section adjuster 124a terminates the section adjustment process when determining that the section management number n is greater than "i" of the ith section that has been combined with the section including the destination Pb (step S45: NO).

When determining from the destination Pb that the section management number "n" is smaller than "i" of the combined ith section (step S45: YES), the section adjuster 124a compares the travel load of the reference section N and the travel load of the section n close to the destination Pb with respect to the reference section N (step S46). Specifically, the section adjuster 124a determines whether or not an absolute value of a difference between the travel load of the reference section N and the travel load of the section n close to the destination Pb with respect to the reference section N is greater than a load threshold (step S47). When determining that the absolute value of the difference in the travel loads of the reference section N and the section n is greater than the load threshold (step S47: YES), the section adjuster 124a combines a plurality of sections from the reference section N to the section "n−1" (step S52). That is, the section adjuster 124a resets the reference section N to the section "n−1" as one section. Further, the section adjuster 124a calculates an average value of the travel load from the section N to the section "n−1" since the travel loads from the reference section N to the section "n−1" are approximate to each other. The section adjuster 124a newly sets the section n as the reference section N (N=n), and increments the management number "n" (n=n+1, step S53). The section adjuster 124a then proceeds to step S49.

When determining that the absolute value of the difference in the travel loads of the reference section N and the section n is smaller than the load threshold (step S47: NO), the section adjuster 124a does not combine the section and simply increments the management number "n" (n=n+1. Step S48). In other words, the subject compared with the travel load of the reference section N is updated to the section that is one section closer to the destination Pb, and the section adjuster 124a proceeds to step S49.

The section adjuster 124a determines whether or not the management number "n" is a value smaller by "1" than "i" of the ith section combined from the destination Pb (step S49). In other words, the section adjuster 124a determines whether or not the section n, in which the combining has been performed from the present location Pa, is the final section that can be combined. When determining that the management number "n" is still not a value that is smaller by "1" than "i" of the ith section combined from the destination Pb (step S49: NO), the section adjuster 124a returns to step S46 to combine the remaining sections.

When determining that the management number "n" is increased to a value smaller by "1" than "i" of the ith section combined from the destination Pb (step S49: YES), the section adjuster 124a combines a plurality of sections from the reference section N to the section "n−1" (step S50), and terminates the section adjustment process.

FIG. 6 illustrates the operation of the present embodiment using an example of the travel route serving as the subject for planning the travel modes described above. As shown in FIG. 6, the travel route searched by the navigation system 112 is from the present location Pa to the destination Pb, and includes the zeroth section k0 to the eighth section k8. The information associated with the distance, travel load, and energy consumption of the zeroth section k0 to the eighth section k8 is obtained from the map information database 111.

The section adjuster 124a first performs combining from the final section (i=8). However, in the example of FIG. 6, the distance D of the eighth section k8, which is the final section, is already greater than or equal to the predetermined distance alpha (step S43: YES). Thus, the eighth section k8 is not combined. In sections close to the destination Pb where the battery 110 may be depleted, the predetermined distance alpha is set so as not to be excessively long.

The section adjuster 124a combines a plurality of sections in which the difference between the travel load of reference section N and the travel load of section n is less than or equal to the load threshold (3 kW) from the zeroth section k0, which is the reference section N=0. Therefore, the zeroth section k0 to the second section k2 are combined and set as a new zeroth section k0. In the same manner, the third section k3 to the fifth section k5 are combined and set as a new third section k3. The sixth section k6 and the seventh section k7 are combined and set as a new sixth section k6. The average travel load is set to for the combined sections. The new eighth section k8 of FIG. 6 is shorter than each of the new zeroth section k0, the new third section k3, and the new sixth section k6.

The mode planner 124b plans the travel mode based on the remaining energy amount of the battery 110, and the travel load and the energy consumption of the new zeroth section k0, the new third section k3, the new sixth section k6, and the eighth section k8. The mode planner 124b classifies the new sections into a low load region and a high load region based on whether the travel load is low load or high load. Therefore, the new zeroth section k0 and the eighth section k8 having low loads are assigned with the travel mode of the EV mode and the new third section k3 and the new sixth section k6 of high load are assigned with the travel mode of the HV mode.

In the present embodiment, at the vicinity of the destination Pb, only sections of which distance from the destination Pb is greater than or equal to the predetermined distance alpha are combined. The travel modes are planned for the travel route including the combined sections. In a section that is assigned with the EV mode section and close to the destination Pb, the battery 110 may be depleted when the vehicle 100 is actually travelling. This limits the setting of such a section that is excessively longer than the predetermined distance alpha. This reduces situations in which the point at which the battery 110 may be depleted when the vehicle is actually travelling differs from the switching point of the planned travel modes. Therefore, the travel support device, the travel supporting method, and the drive support system may appropriately switch the travel modes in the sections set in the travel route.

The present embodiment described above has the following advantages in addition to advantage (1) of the first embodiment.

(5) Sections other than a section close to the destination Pb are combined. The travel modes are planned for sections that have undergone the section adjustment process including the combination of sections. Therefore, sections are combined and a travel mode is assigned to each section. A section including the point at which the battery may be depleted when the vehicle is actually travelling is not combined. This reduces situations in which the point at which the battery 110 may be depleted when the vehicle is actually travelling differs from the switching point of the planned travel modes. Therefore, the travel modes may be appropriately switched in the sections set in the travel route.

(6) A section in which the distance to the destination Pb is smaller than or equal to the predetermined distance alpha is not combined. Therefore, a section excessively longer than the predetermined distance alpha is not set near the destination Pb. This reduces situations in which the point at which the battery 110 may be depleted when the vehicle is actually travelling differs from the switching point of the planned travel modes.

It should be apparent to those skilled in the art that the present invention may be embodied in many other specific forms without departing from the spirit or scope of the invention. Particularly, it should be understood that the present invention may be embodied in the following forms.

The first embodiment and the second embodiment may both be performed. In other words, a plurality of sections in which the distance to the destination Pb is greater than or equal to the predetermined distance alpha may be combined and the section closest to the destination Pb may be divided so as to be smaller than or equal to the predetermined distance. Thus, the processing load of the section information and the processing load for assigning the travel modes may be reduced. This reduces situations in which the point at which the battery 110 may be depleted when the vehicle is actually travelling differs from the switching point of the planned travel modes.

In the first embodiment, the hypothetical travel load is set to be smaller in order from sections closer to the destination Pb to sections farther from the destination in the travel route. However, a hypothetical travel load of the same value may be set to each section.

In the first embodiment, the distance of the section of the EV mode closest to the destination Pb is divided so as to become smaller than or equal to the predetermined distance alpha. However, the predetermined distance alpha may be set to any value.

In the first embodiment, the EV mode section that is closest to the destination Pb is divided. Instead, a section close to the destination Pb in which the battery 110 may be depleted may be divided.

In the second embodiment, the sections in which the distance to the destination Pb is greater than or equal to the predetermined distance alpha are combined. However, the predetermined distance alpha may be set to any value.

Figure 7:
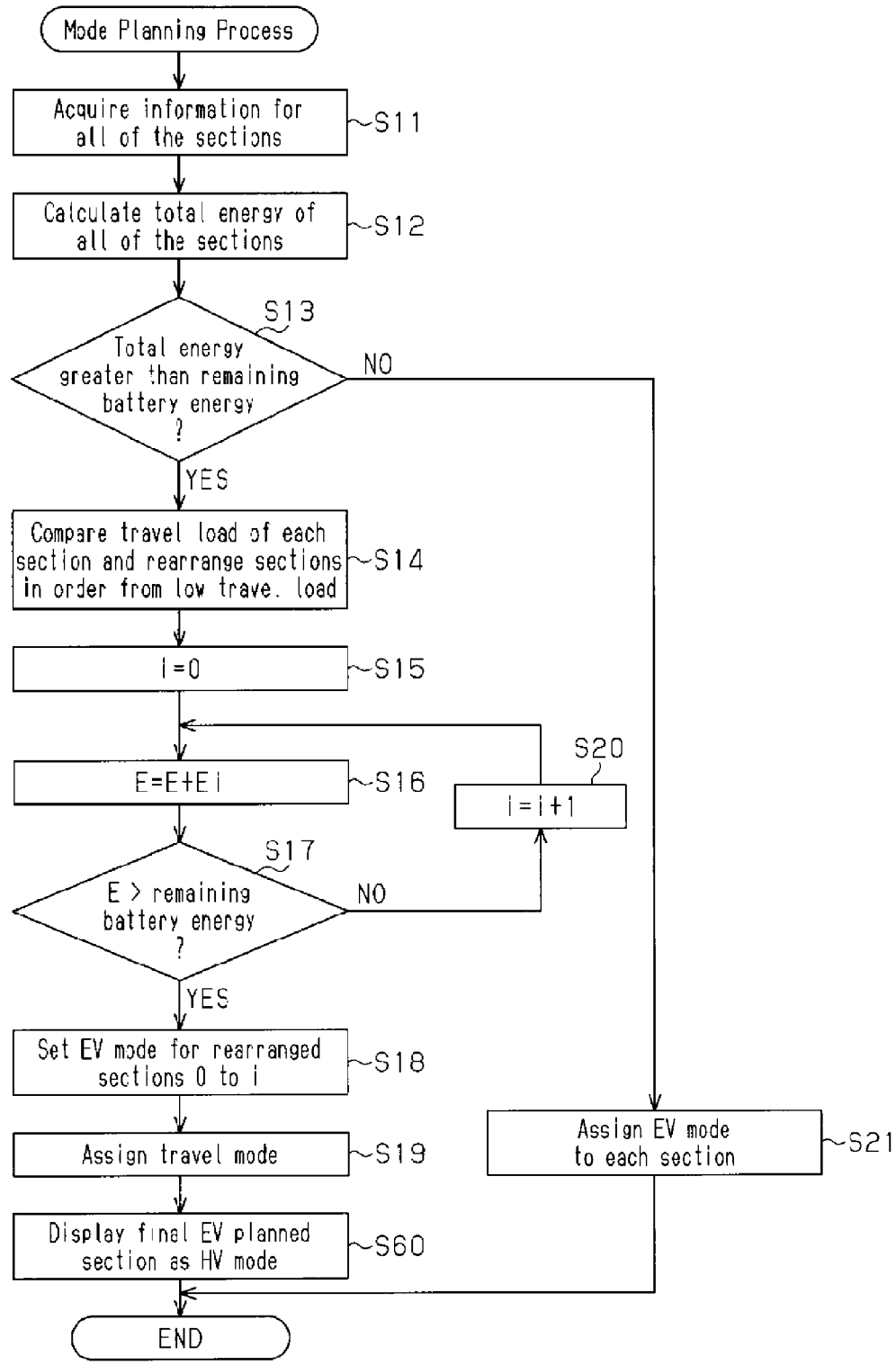
FIG. 7 is a flowchart of a process for planning travel modes with a travel support device of a modified example.

FIG. 7 shows a modified example of the planning process of the travel mode shown in FIG. 2. In each embodiment described above, the display device 113 may display the travel mode of the section closest to the destination Pb to which the EV mode is planned as the HV mode. In other words, after assigning the travel mode in step S19, the mode planner 124b displays the final EV planning section as the HV mode in step S60. Thus, the driver is less likely to be annoyed. If actual situations are not as predicted due to changes in the traffic flow and early depletion of the battery 110, the vehicle may actually travel in the HV mode where the EV mode had been planned. In such a case, by displaying the final EV planning section as the HV mode, the driver would not anticipate that the vehicle will travel in the EV mode.

In each embodiment described above, the in-vehicle network is a CAN. However, the in-vehicle network only needs to be a network that can communicably connect the connected ECU, and may be configured from other networks such as Ethernet (registered trademark), FlexRay (registered trademark), or IEEE 1394 (FireWire (registered trademark)). The CAN may be combined with such networks. This improves the degree of freedom for the configuration of the vehicle in which the travel support device is used.

In each embodiment described above, the navigation system 112 and the drive supporter 124 are different configurations. However, the navigation system and the drive supporter may be arranged in the same device. This improves the degree of freedom for the configuration of the travel support device.

In each embodiment described above, the hybrid controller 108 and the drive supporter 124 are different configurations. However, the hybrid controller and the drive supporter may be arranged in the same device. This improves the degree of freedom for the configuration of the travel support device.

In each embodiment described above, devices such as the navigation system 112, the display device 113, and the in-vehicle controller 120 are integrated with the vehicle 100. However, as long as each device such as the navigation system, the display device, and the in-vehicle controller can be connected communicably with each other, all or some of the functions may be provided in a portable information processor such as a cellular phone or a smartphone. This improves the degree of design freedom for the travel support device.

In each embodiment described above, the drive supporter 124, the navigation system 112, and the map information database 111 are installed in the vehicle 100. However, some or all of the functions of a drive supporter, a navigation system, and a map information database may be implemented by an information processor located outside the vehicle or a portable information processor. The information processor may be an information processing center, and the portable information processor may be a cellular phone or a smartphone. The information processor need only be capable of exchanging information through a wireless communication line. The portable information processor may be connected to an in-vehicle network. The portable information processor may also perform short distance communication. Further, the portable information processor may exchange information through a wireless communication line. This improves the degree of design freedom for the travel support device.

In each embodiment described above, the travel load of each section in the travel route is acquired or calculated from the information contained in the map information database. Instead, the travel load of the section in the travel route may be acquired or calculated from a learning database. If the vehicle has travelled along the route in the past, the travel load stored in the learning database when the vehicle travelled the route in the past may be used. This improves the degree of design freedom for the travel support device.

In each embodiment described above, the EV mode is assigned to the sections in the order of low travel load. However, the EV mode need only be assigned. For example, the EV mode may be assigned to each section based on determinations made with one or more pieces of information contained in map data such as the road gradient, the limit speed, and the road type. The EV mode may also be assigned to each section based on the efficiency of the internal combustion engine and the efficiency of the battery. This improves the degree of design freedom for the travel support device.

In each embodiment described above, the drive supporter 124 plans the travel mode. However, the hybrid controller may plan the travel mode. This improves the degree of design freedom for the travel support device.

In each embodiment described above, the travel modes are planned when the vehicle 100 is at the present location Pa. However, the travel modes may be planned at any point when the vehicle 100 is travelling toward the destination Pb. A travel mode may be planned at any point for each section in the travel route. This improves the degree of design freedom for the travel support device.

The present examples and embodiments are to be considered as illustrative and not restrictive, and the invention is not to be limited to the details given herein, but may be modified within the scope and equivalence of the appended claims.

DESCRIPTION OF THE REFERENCE NUMERALS

100 Vehicle
101 GPS
102 In-Vehicle Camera
103 Millimeter Wave Radar
104 Acceleration Sensor
105 Vehicle Speed Sensor
106 Accelerator Sensor
107 Brake Sensor
108 Hybrid Controller
109 Battery Actuator
110 Battery
111 Map Information Database
112 Navigation System
113 Display Device
114 Meter Controller
115 Accelerator Actuator
116 Brake Actuator
120 In-Vehicle Controller
124 Drive Supporter
124a Section Adjuster
124b Mode Planner
Pa present location
Pb destination
alpha predetermined distance

The invention claimed is:

1. A travel support device that supports travelling of a vehicle from a present location to a destination, wherein
the vehicle includes an internal combustion engine and a motor,
the motor uses a battery,
the motor functions as a drive source of the vehicle in an EV mode,
at least the internal combustion engine functions as a drive source of the vehicle in an HV mode,
a travel route of the vehicle from the present location to the destination is divided into a plurality of sections,
the sections include sections relatively close to the destination and sections relatively distant from the destination,
for each of the sections, a travel load of when the vehicle travels in the EV mode in the section is set,
the travel support device comprising:
a mode planner configured to plan either one of the EV mode and the HV mode as a travel mode for each of the sections; and
a section adjuster that adjusts the sections relatively close to the destination to be shorter than the sections relatively distant from the destination,
wherein the mode planner is configured to plan one of the EV mode and the HV mode as a travel mode for each of the adjusted sections.

2. The travel support device according to claim 1, wherein the section adjuster is configured to divide the one of the sections planned to be in the EV mode that is closest to the destination.

3. The travel support device according to claim 2, wherein the section adjuster is configured to divide the one of the sections that is closest to the destination so that a length of a section obtained by dividing the one of the sections that is closest to the destination is smaller than or equal to a predetermined distance.

4. The travel support device according to claim 2, wherein the section adjuster is configured to set a hypothetical travel load for the divided sections to plan the HV mode as the travel mode from the one of the divided sections that is relatively close to the destination.

5. The travel support device according to claim 1, wherein the section adjuster is configured to combine the sections that are relatively distant from the destination.

6. The travel support device according to claim 5, wherein the section adjuster is configured to combine sections in which a distance to the destination is greater than or equal to a predetermined distance.

7. The travel support device according to claim 1, further comprising a display device that visually displays the planned travel modes, wherein the display device is configured to display the travel mode as the HV mode for the one of the sections that is closest to the destination and planned to be in the EV mode.

8. A travel supporting method for supporting travelling of a vehicle from a present location to a destination, the vehicle including an internal combustion engine and a motor as a drive source, and the motor using a battery, wherein
the vehicle includes an internal combustion engine and a motor, each functioning as a drive source,
the motor uses a battery,
the motor functions as the drive source of the vehicle in an EV mode,
at least the internal combustion engine functions as the drive source of the vehicle in an HV mode, the travel supporting method comprising:
dividing a travel route of the vehicle from the present location to the destination into a plurality of sections, wherein the sections include sections relatively close to the destination and sections distant from the destination;
setting, for each of the sections, a travel load of when the vehicle travels in the EV mode in the section;
planning either one of the EV mode and the HV mode as a travel mode for each of the sections;
adjusting the sections so that the sections relatively close to the destination become shorter than the sections relatively distant from the destination; and
planning the travel mode for each of the adjusted sections.

9. The travel supporting method according to claim 8, wherein the adjusting the sections includes dividing the one of the sections planned to be in the EV mode that is closest to the destination.

10. The travel supporting method according to claim 8, wherein the adjusting the sections includes combining the sections that are relatively distant from the destination.

11. The travel supporting method according to claim 8, further comprising:
visually displaying the planned travel modes on a display device; and
displaying the travel mode as the HV mode for the one of the sections that is closest to the destination and planned to be in the EV mode.

12. A drive support system that supports driving of a vehicle, wherein
the vehicle includes an internal combustion and a motor,
the motor uses a battery,
the motor functions as the drive source of the vehicle in an EV mode,
at least the internal combustion engine functions as the drive source of the vehicle in an HV mode,
a travel route of the vehicle from a present location to a destination is divided into a plurality of sections;
either one of the EV mode and the HV mode is planned as a travel mode for each of the sections,
the drive support system is configured to support the driving of the vehicle based on the travel mode,
the drive support system comprising a travel support device that supports travelling of the vehicle from the present location to the destination, wherein
the sections include sections relatively close to the destination and sections relatively distant from the destination,
for each of the sections, a travel load of when the vehicle travels in the EV mode in the section is set,
the travel support device includes
a mode planner that is configured to plan either one of the EV mode and the HV mode as the travel mode for each of the sections, and
a section adjuster that adjusts the sections so that the sections relatively close to the destination become shorter than the sections relatively distant from the destination, and
the mode planner is configured to plan one of the EV mode and the HV mode as the travel mode for each of the adjusted sections.

* * * * *